(12) United States Patent
Al-Ofi et al.

(10) Patent No.: US 12,487,202 B2
(45) Date of Patent: Dec. 2, 2025

(54) ESTIMATION OF DIELECTRIC PROPERTIES OF A DOWNHOLE FLUID

(71) Applicants: Baker Hughes Oilfield Operations LLC, Houston, TX (US); Saudi Arabian Oil Company, Dhahran (SA)

(72) Inventors: Salah Mohammed Al-Ofi, Khobar (SA); Guodong Jin, Katy, TX (US); Shouxiang Ma, Dhahran (SA)

(73) Assignees: BAKER HUGHES OILFIELD OPERATIONS LLC, Houston, TX (US); SAUDI ARABIAN OIL COMPANY, Dhahran (SA)

( * ) Notice: Subject to any disclaimer, the term of this patent is extended or adjusted under 35 U.S.C. 154(b) by 382 days.

(21) Appl. No.: 18/169,639

(22) Filed: Feb. 15, 2023

(65) Prior Publication Data

US 2024/0272104 A1    Aug. 15, 2024

(51) Int. Cl.
*G01N 27/02* (2006.01)
*E21B 49/08* (2006.01)

(52) U.S. Cl.
CPC ........... *G01N 27/026* (2013.01); *E21B 49/08* (2013.01)

(58) Field of Classification Search
CPC .............................. G01N 27/026; E21B 49/08
See application file for complete search history.

(56) References Cited

U.S. PATENT DOCUMENTS

| 6,831,470 | B2 | 12/2004 | Xie et al. |
| 10,732,315 | B2 | 8/2020 | Zhang et al. |
| 10,996,364 | B2 | 5/2021 | Wang et al. |
| 2009/0200016 | A1* | 8/2009 | Goodwin ............... E21B 47/10 166/248 |

(Continued)

FOREIGN PATENT DOCUMENTS

WO     2008079512 A1     7/2008

OTHER PUBLICATIONS

Forgang et al., "A New Multi-Frequency Array-Dielectric Logging Service: Tool Physics, Field Testing . . . "; SPWLA 60th Annual Logging Symposium; Paper No. SPWLA-2019-W; Jun. 2019; 21 pages.

(Continued)

*Primary Examiner* — Lisa M Caputo
*Assistant Examiner* — Nyla Gavia
(74) *Attorney, Agent, or Firm* — CANTOR COLBURN LLP

(57) ABSTRACT

A method of analyzing a downhole fluid includes performing measurements of a dielectric property of the downhole fluid, the downhole fluid including a mixture of a filtrate fluid circulated through a borehole and a connate fluid. The measurements include a first measurement of the downhole fluid, and one or more additional measurements, each additional measurement performed after an amount of the filtrate fluid is injected into the downhole fluid to change the volume ratio, each additional measurement performed when the downhole fluid has a different volume ratio. The method (Continued)

also includes acquiring a plurality of reference profiles of respective reference mixtures, the respective reference mixtures including a first fluid and a reference fluid, comparing the measurements to each reference profile, and estimating a value of the dielectric property of the connate fluid based on the comparing.

20 Claims, 6 Drawing Sheets

(56) References Cited

U.S. PATENT DOCUMENTS

| | | | |
|---|---|---|---|
| 2013/0268201 A1* | 10/2013 | Gzara | G01V 11/00 |
| | | | 702/9 |
| 2014/0332280 A1 | 11/2014 | van Zuilekom et al. | |
| 2015/0054512 A1* | 2/2015 | DiFoggio | E21B 49/088 |
| | | | 324/324 |
| 2017/0167256 A1 | 6/2017 | Torres | |
| 2017/0321504 A1 | 11/2017 | Ye et al. | |
| 2018/0171788 A1* | 6/2018 | Waid | E21B 49/088 |
| 2018/0275307 A1 | 9/2018 | Pan et al. | |
| 2020/0072047 A1 | 3/2020 | Lee et al. | |
| 2022/0035066 A1 | 2/2022 | Zhang et al. | |

OTHER PUBLICATIONS

Meador, et al., "Dielectric Constant Logging, A Salinity Independent Estimation of Formation Water Volume;" Society of Petroleum Engineers of AIME; Paper No. SPE-5504-MS; Sep. 1975; 15 pages.

Meissner et al., "The Complex Dielectric Constant of Pure and Sea Water From Microwave Satellite Observations;" IEE Transactions on Geoscience and Remote Sensing, vol. 42, No. 9, Sep. 2004; 14 pages.

Zhang et al., "Deep Dielectric-Based Water Saturation in Freshwater and Mixed Salinity Environments"; SPWLA 62nd Annual Logging Symposium; Paper No. SPWLA-2021-0033; May 2021; 11 pages.

International Search Report and Written Opinion for International Application No. PCT/US2024/015094, International Filing Date Feb. 9, 2024, Date of Mailing May 24, 2024, 8 pages.

* cited by examiner

ESTIMATION OF DIELECTRIC PROPERTIES OF A DOWNHOLE FLUID

BACKGROUND

Borehole drilling is utilized in a number of applications, including exploration and production of natural gases and fluids, mineral extraction, gas storage, waste disposal, carbon dioxide sequestration, geothermal production and others. For example, in subterranean operations (e.g., hydrocarbon exploration and production operations), boreholes are drilled deep into the earth to access hydrocarbon-bearing formations. Dielectric measurements and/or other types of measurements are typically performed during such operations for purposes such as evaluating fluids in a formation.

SUMMARY

An embodiment of a method of analyzing a downhole fluid includes performing measurements of a dielectric property of the downhole fluid, the downhole fluid including a mixture of a filtrate fluid circulated through a borehole and a connate fluid originating in a subterranean region proximate to the borehole, the filtrate fluid having a known value of a dielectric property, the downhole fluid having an initial value of a volume ratio corresponding to a ratio of a volume of the filtrate fluid to the volume of the downhole fluid. The measurements include a first measurement of the downhole fluid, and one or more additional measurements, each additional measurement performed after an amount of the filtrate fluid is injected into the downhole fluid to change the volume ratio, each additional measurement performed when the downhole fluid has a different volume ratio. The method also includes acquiring a plurality of reference profiles, each reference profile acquired by at least one of measuring the dielectric property of a respective reference mixture and estimating the dielectric property by a mathematical model, the respective reference mixture including a first fluid and a reference fluid, the first fluid having the known value of the dielectric property, each reference profile representing a change in the dielectric property of the respective reference mixture as a function of a change in a volume ratio of the respective reference mixture, comparing the measurements to each reference profile, and estimating a value of the dielectric property of the connate fluid based on the comparing.

An embodiment of a system for analyzing a downhole fluid includes a measurement device configured to measure a dielectric property of the downhole fluid, the downhole fluid including a mixture of a filtrate fluid circulated through a borehole and a connate fluid originating in a subterranean region proximate to the borehole, the filtrate fluid having a known value of the dielectric property, the downhole fluid having an initial value of a volume ratio corresponding to a ratio of a volume of the filtrate fluid to the volume of the downhole fluid. The system also includes a processing device configured to receive measurements of the dielectric property of the downhole fluid, the measurements including a first measurement of the downhole fluid, and one or more additional measurements, each additional measurement performed after an amount of the filtrate fluid is injected into the downhole fluid to change the volume ratio, each additional measurement performed when the downhole fluid has a different volume ratio. The processing device is configured to acquire a plurality of reference profiles, each reference profile acquired by at least one of measuring the dielectric property of a respective reference mixture and estimating the dielectric property by a mathematical model, the respective reference mixture including a first fluid and a reference fluid, the first fluid having the known value of the dielectric property, each reference profile representing a change in the dielectric property of the respective reference mixture as a function of a change in a volume ratio of the respective reference mixture. The processing device is further configured to compare the measurements to each reference profile, and estimate a value of the dielectric property of the connate fluid based on the comparing.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
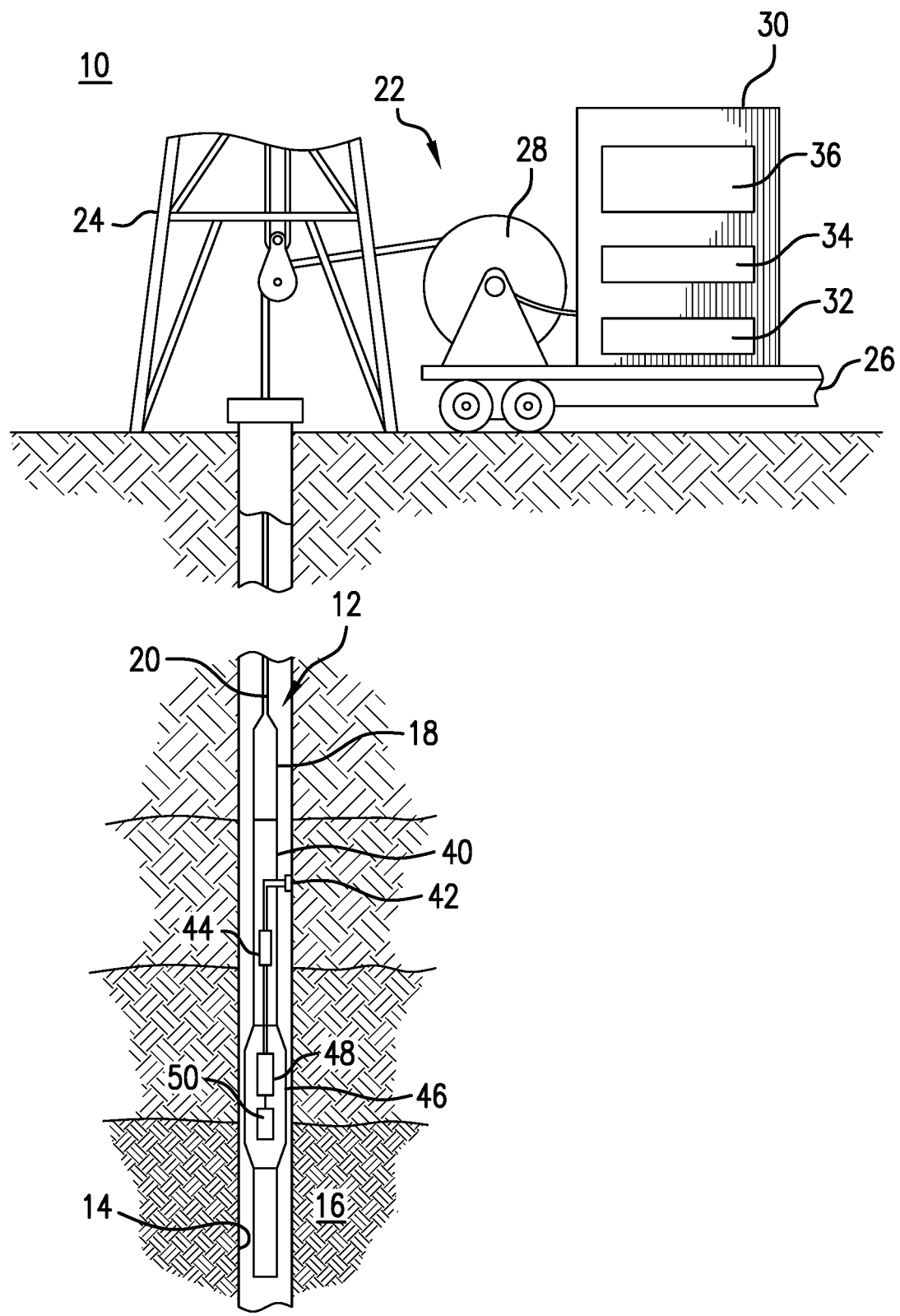
FIG. 1 depicts an embodiment of a system configured for performing subterranean operations, such as sampling and/or measurement operations.

Systems and methods are provided for estimating dielectric properties of fluids extracted from a subterranean region. Embodiments of a fluid analysis system and method are provided for estimation of a dielectric property of a connate fluid (e.g., a formation fluid) based on dielectric measurements of a downhole fluid, such as a fluid sample or measurements of the downhole fluid flowing along a borehole. The downhole fluid includes a filtrate fluid that is circulated through the borehole (e.g., a water-based drilling mud), or injected fluid from a nearby well, and may include an amount of a connate fluid extracted from the subterranean region.

The method includes changing a volume ratio (a ratio of the filtrate fluid volume to a total volume of the downhole fluid) of the downhole fluid, and taking dielectric measurements of the downhole fluid for each volume ratio. The measurements are compared to each of a plurality of reference curves or reference profiles, which may be stored as a lookup table or other data structure. Each reference curve relates a dielectric property to a volume ratio of a reference fluid. Each reference fluid is a mixture of the filtrate fluid (or a fluid having the same or similar properties as the filtrate fluid or injected fluid, such as the same salinity) and one of various other fluids, such that the other fluids have different properties than one another and the filtrate fluid.

The method also includes comparing the dielectric measurements to each reference curve, and estimating the dielectric property of the connate fluid based on the comparison. For example, the measurements are provided as a measurement profile of the dielectric property of the mixture as a function of volume ratio, assuming the filtrate or injected fluid dielectric property is known, and the reference curve that is closest to the measurement profile (e.g., is the best fit) is selected. The dielectric property of the other fluid of the selected reference curve is selected as the dielectric property of the connate fluid, or is otherwise used to estimate the dielectric property of the connate fluid.

Embodiments described herein present numerous advantages and technical effects. The embodiments provide effective techniques for estimating a dielectric property of a connate fluid in a fluid mixture without the need to separate the connate fluid. In addition, the dielectric property can be estimated without knowledge of instantaneous volume proportions of the fluid mixture at a given measurement point.

Embodiments are useful for effectively evaluating formation water and other fluids in fluid samples that are contaminated with filtrate fluid or injected fluid from a nearby well. Formation water contamination from drilling mud or an injector well poses a challenge for petrophycisists and fluids analysts, as the contamination masks the original (connate) water properties required for accurate reservoir evaluation and modeling. One major challenge is the interpretation of electrical logs, which typically requires knowledge of formation water salinity. In the case of water-based mud systems (WBM), it is often difficult to evaluate invaded and transition zones in reservoirs due to a mixing process of connate water and drilling fluid, which makes the connate water phase salinity difficult to estimate.

Uncertainties in connate water salinity may increase the uncertainty of formation property estimations (e.g., water-filled porosity estimation) especially in a mixed salinity environment where the salt concentration of a drilling fluid is different than a formation fluid. Thus, estimating the apparent salinity of mixed brine and connate water is challenging from dielectric data, and as a result, analysts often estimate the salinity of connate water in mixed fluids based on prior knowledge of drilling fluid properties and formation fluids from nearby wells (or using a mixture salinity), which can be inaccurate. Embodiments address the above limitations by providing effective techniques for estimating formation water and other subterranean fluid salinity without the need to isolate the formation water or make potentially inaccurate assumptions.

FIG. 1 shows an embodiment of a system 10 for performing a subterranean operation (e.g., measurement, survey, drilling, stimulation and/or production). The system 10 includes a borehole string 12 that is shown disposed in a well or borehole 14 that penetrates a subterranean region 16 (including, for example, at least one earth formation). In an embodiment, the borehole string 12 is a wireline string that includes a string assembly such as a wireline tool string 18 configured to be deployed in the borehole via a cable 20. The cable 20 may be an armored cable or other structure and include one or more conductors (e.g., wires and/or optical fiber) for communicating with surface equipment 22.

The borehole 14 can be at least partially filled with a liquid or fluid that is injected and/or circulated in the borehole 14, and is referred to herein as a "filtrate fluid." In an embodiment, the filtrate fluid includes a water-based fluid suspension known in the art as "drilling mud." It is noted that description of filtrate fluid and drilling mud is not intended to be limiting as to specific fluid formulations.

The surface equipment 22 includes a drilling rig 24 and a wireline rig 26. The wireline rig 26 includes a spool or drum 28 connected to a surface control unit 30. The surface control unit 30 can perform functions such as controlling deployment and retrieval of the tool string 18, communicating via a telemetry system, collecting data, analyzing data, transmitting data and/or analysis to a remote location, and others. For example, the surface control unit 30 includes a telemetry unit 32, a control unit 34 for deploying the tool string 18, and a data collection and analysis unit 36. The surface control unit and/or individual units therein include appropriate components such as an input/output (I/O) device, a processor and a data storage device (e.g., memory, computer-readable media, etc.) for storing data, models and/or computer programs or software that cause a processor to perform aspects of methods and processes described herein.

The system 10 and the borehole string 12 are not limited to wireline. For example, the borehole string 12 can be a production string (e.g., including coiled tubing or pipe), drill string or other type of string that can be disposed in the borehole 14.

In an embodiment, the tool string 18 includes a sampling tool 40 configured to extract a sample of formation fluid from the subterranean region 16. The sampling tool 40 includes an extraction device 42 configured to extend laterally and form an enclosed volume about a portion of a wall of the borehole 14. By reducing pressure inside the volume, a sample of the formation fluid can be extracted into the volume. The sampling tool 40 may include one or more containers 44 that serve as a fluid source for downhole measurements or may be retrieved at the surface for analysis. The sampling tool 40 may be connected to a measurement tool 46 that includes one or more measurement cells or chambers 48. It is noted that the sampling tool 40 and the measurement tool 46 may be multiple tools as shown, or incorporated as a single tool or component.

The measurement tool 46 is configured to measure one or more dielectric properties of a sampled fluid. In an embodiment, the measurement tool 46 includes a radiation source for emitting microwave radiation and/or other forms of radiation into the one or more containers. The radiation source may include or be connected to a probe that can be immersed in a fluid to be measured, such as an open-ended coaxial line. For example, the measurement tool 46 includes a signal generator configured to generate signals within a selected frequency range (e.g., about 1 GHz to at least about 50 GHZ). A sensing device such as a spectroscopy device estimates properties (e.g., phase shift and attenuation) of the signals after interaction with the sample. The signal properties may be used by the analysis unit 36 or other suitable processing device to estimate dielectric properties, such as dielectric constant, resistivity and/or conductivity.

The dielectric measurement can be obtained using other types of measurement techniques. Examples of such techniques a two parallel-plate capacitance method or use of an electromagnetic reasonator with associated processing methods to convert measured voltage to complex dielectric constant at single frequency or multiple frequencies.

The measurement tool 46 and/or other components of the tool string 18 may include additional sensing devices for measuring temperature, flow rate density and others.

Measurements can be collected and/or analyzed at a surface location or a downhole location. For example, the measurement tool 46 includes or communicates with an analysis unit 50 that includes a processor, a memory (volatile and/or non-volatile memory) and other components to facilitate analyzing and/or storing data. Thus, measurements may be transmitted to the analysis unit 50 and/or to the surface control unit 30. Collected data and/or analysis results may be transmitted to the surface via the cable 20.

A processing device or processor, such as the surface analysis unit 36 or the downhole analysis unit 50, is configured to receive measurement data and control aspects of estimating or predicting a dielectric property or properties of a connate fluid, such as formation water. In an embodiment, the method includes estimating or predicting a salinity of a connate fluid by analyzing dielectric measurements of a downhole fluid, which includes a mixture of the connate fluid and a water-based filtrate fluid having a known salinity (e.g., water-based mud). A "connate fluid" or "connate" refers to water and/or other fluid originating or produced from a subterranean region. A "filtrate fluid" or "filtrate" refers to a fluid that is injected into a borehole and circulated therethrough.

The processing device may be further configured to derive or estimate other properties based on a salinity or other estimated property. For example, the processing device is configured to determine a level of contamination of the connate fluid with the filtrate fluid, and/or evaluate the quality and purity of produced formation water.

Figure 2:
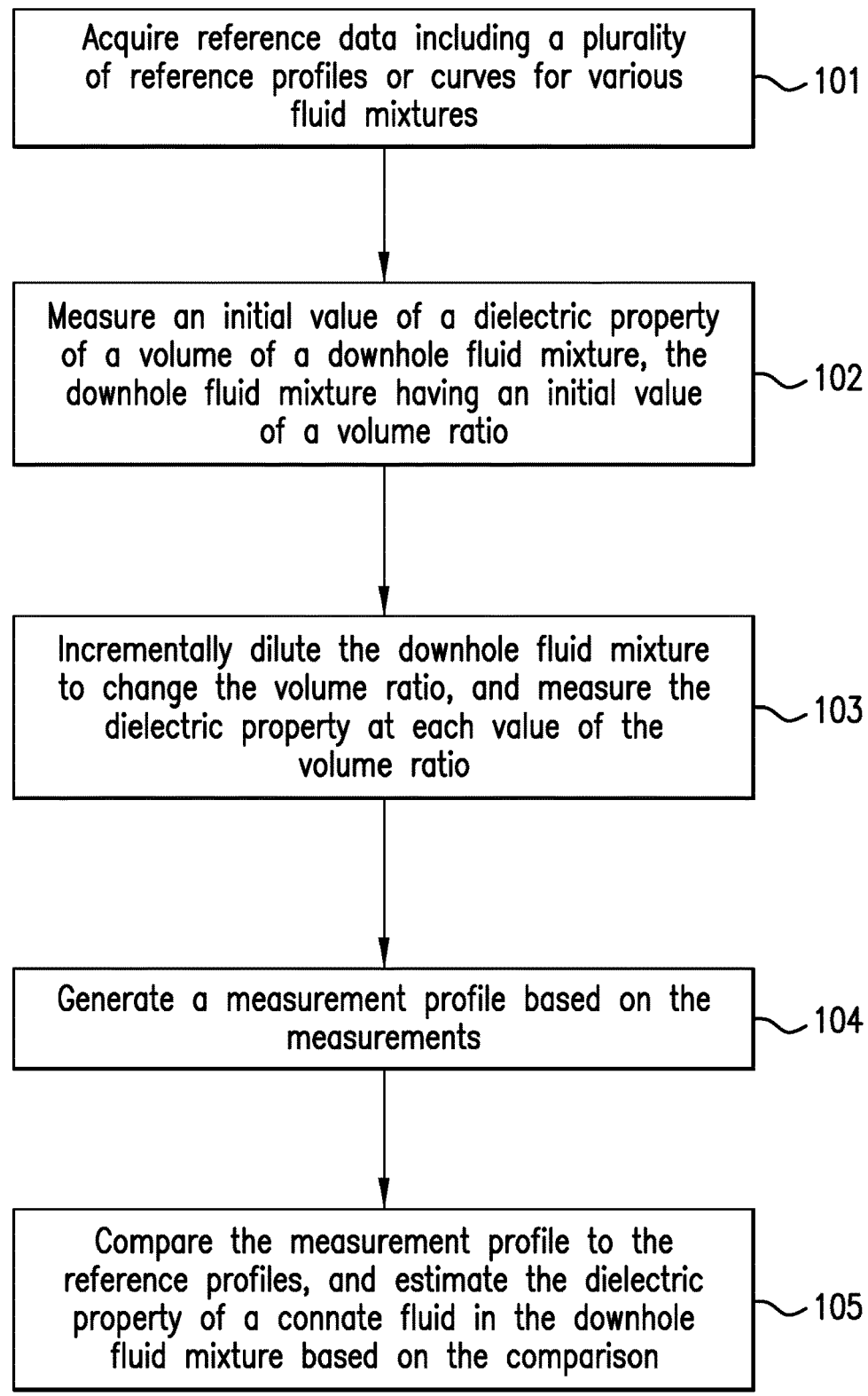
FIG. 2 is a flow diagram depicting an embodiment of a method of analyzing a downhole fluid.

FIG. 2 is a flow diagram representing a method 100 of analyzing a downhole fluid. The method 100 includes a plurality of method steps or stages, represented by blocks 101-105. The method 100 may include all of the stages or steps in the order described. However, certain stages or steps may be omitted, stages may be added, or the order of the stages changed.

At block 101, a set of reference data is collected or acquired. The set of reference data includes a plurality of reference profiles that relate a volume ratio of a reference fluid mixture to a dielectric property of the reference fluid mixture. Each reference mixture includes a first fluid and a second fluid. The first fluid has the same or similar dielectric property (e.g., salinity) as a filtrate fluid used in a subterranean operation, and is referred to as a "reference filtrate fluid" or "reference filtrate." The second fluid is another fluid having a different value of the dielectric property than the reference filtrate fluid, which is referred to as a "reference connate fluid" or "reference connate." In an embodiment, each reference mixture includes the same reference filtrate fluid and a different reference connate fluid. Each reference curve or profile can be stored in a lookup table (LUT) or other data structure that allows comparing measurements of fluid mixtures sampled during a subterranean operation to the reference profiles.

In an embodiment, each reference profile is calculated by performing a fluid mixture alteration process on a respective reference fluid mixture. The mixture alteration process includes injecting selected amounts of the reference filtrate fluid into a fixed volume of the reference fluid mixture to change a volume ratio $P_m$ of the reference fluid mixture. A dielectric property of the reference fluid mixture is measured for each change in the volume ratio $P_m$, and the measurements are used to derive a reference profile that relates values of the dielectric property to volume ratio values. The volume ratio ($P_m$) is a ratio of filtrate volume ($V_f$) to the overall volume ($V_m$) of a mixture ($P=V_f/V_m$).

In an embodiment, the reference connate fluid and the reference filtrate fluid in a given reference mixture have different values of the dielectric property (e.g., dielectric constant and/or conductivity) due to a difference in salinity of each fluid and their relative volumes in the mixture. For example, each fluid is a brine having a different salinity (i.e., concentration of a salt), wherein one of the brines (the reference filtrate fluid) has the same salinity as a filtrate fluid used in the subterranean operation. The other brine (the reference connate fluid) has a different salinity. A mixture of the two fluids has an overall salinity ("mixed salinity") due to the relative volume of the fluids.

In an embodiment, reference data is collected for each of a plurality of different fluid mixtures, i.e., fluid mixtures having combinations of different fluids. For example, a first reference fluid mixture includes a reference filtrate fluid having a salinity (or other property) that is substantially equal to the salinity of a drilling mud, and a reference connate fluid. One or more additional fluid mixtures each include the reference filtrate fluid and a different reference connate fluid having a salinity that is different than the salinity of the first reference connate fluid. Any number of additional fluid mixtures can be created and measured by combining the reference filtrate fluid with reference connate fluids having different salinities.

The dielectric property may be any desired property, such as dielectric constant, resistivity, conductivity and others. For example, the dielectric property is estimated for a given fluid mixture by a water permittivity model that estimates water permittivity $\varepsilon_w$ as a function of temperature T and water salinity S. The model can be represented by the following equation (denoted equation (1)):

$$\varepsilon_w(T, S) = \varepsilon_\infty(T, S) + \frac{\varepsilon_S(T, S) - \varepsilon_1(T, S)}{1 + i\frac{f}{f_1(T, S)}} + \frac{\varepsilon_1(T, S) - \varepsilon_\infty(T, S)}{1 + i\frac{f}{f_2(T, S)}} - i\frac{\sigma(T, S)}{2\pi\varepsilon_o^* f}$$

where $\varepsilon_s$ is a static or zero frequency dielectric constant, $\varepsilon_\infty$ is an infinite frequency dielectric constant, $\varepsilon_1$ is an intermediate frequency dielectric constant, co is free space permittivity ($8.854 \times 10^{-12}$ Farads/m$^2$), and $\sigma$ is conductivity (Siemens/meter or S/m]). Temperature T is measured in degrees Celsius, frequency f is measured in Hertz (Hz) and salinity S is measured in parts per trillion.

The model may be used to derive a salinity $S_m$ of a fluid mixture. This derivation is based on an assumption that both fluids (filtrate and connate fluids) are homogeneously mixed, and a volume $V_m$ of the mixture is constant. Based on these assumptions, the following equation is derived:

$$S_m = \frac{S_f \rho_f Pm + S_c \rho_c (1 - Pm)}{\rho_m} \quad (2)$$

where $S_f$ is the salinity of the filtrate fluid and Sc is the salinity of the connate fluid. $\rho_f$ and $\rho_c$ are known densities of the filtrate fluid and the connate fluid, respectively. The density of the mixture ($\rho_m$) can be calculated using mass balance of the fluid mixture and the volume ratio $P_m$.

Figure 3:
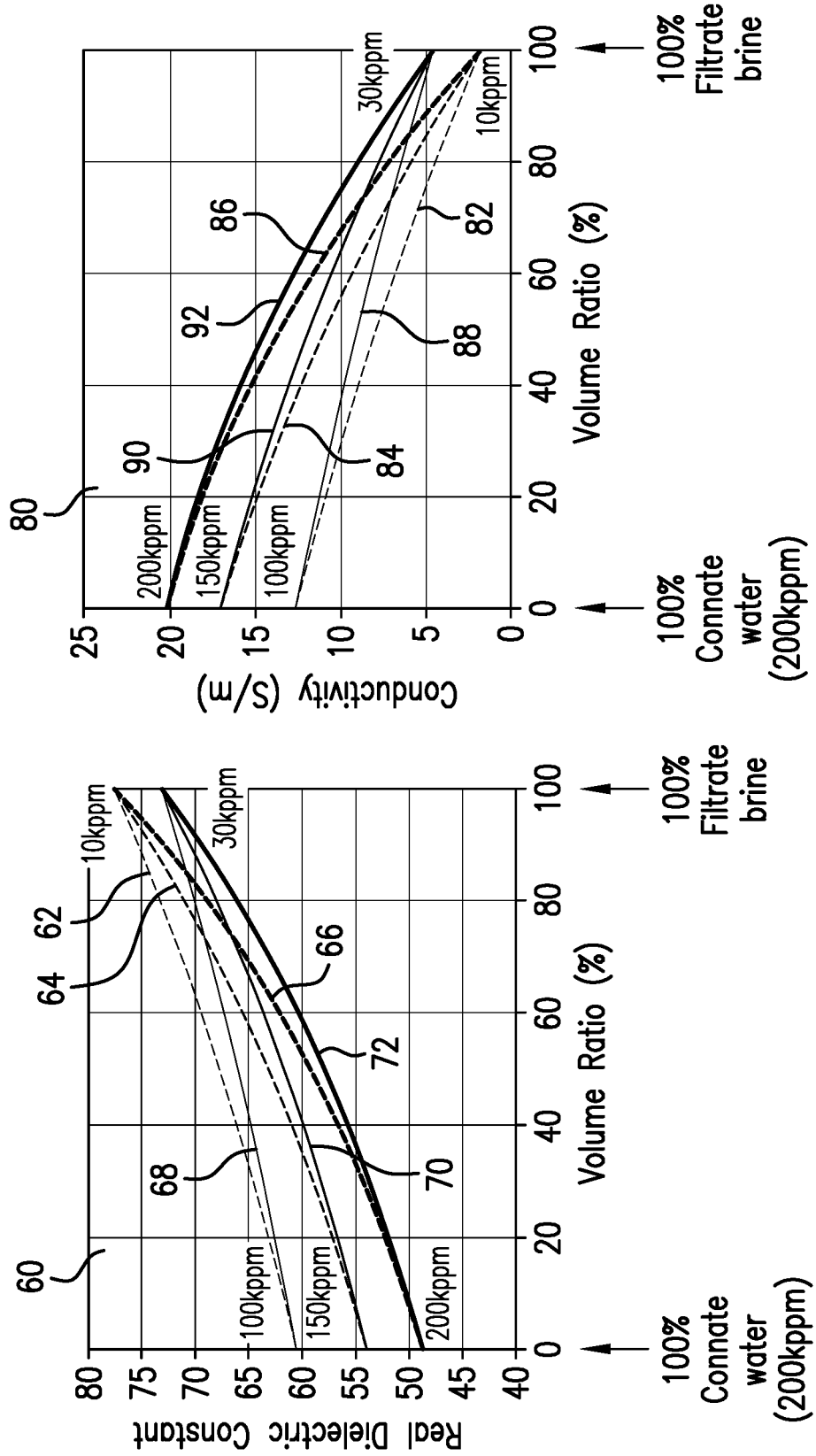
FIG. 3 depicts examples of reference curves or profiles derived from dielectric measurements of various mixtures of fluids.

FIG. 3 depicts examples of reference data in the form of reference curves that relate the volume ratio $P_m$ of various fluid mixtures to a dielectric property. To generate a curve for a mixture of a given connate fluid and filtrate fluid, a dielectric property of a volume of the connate fluid ($P_m=0$) was measured, and the connate fluid was incrementally diluted with the filtrate fluid, such that $P_m$ increases. A measurement was performed after each incremental dilution, and the measurements were used to create a curve showing the change in the dielectric property as a function of volume ratio.

A plurality of reference fluid samples were collected, where each sample was retained in a container at a fixed volume. At each incremental dilution, an amount of the filtrate was injected into the sample and displaced part of the fluid therein to maintain the fixed volume. For example, k measurements were performed on a reference fluid sample at each of a plurality of incremental volume ratios $x_k$.

In this example, the fixed volume was 50 cc. The incremental volume ratio $x_k$ was used as a dilution volume ratio to reduce the salinity of the tested mixture, and is defined as $x_k = P_k - P_{k-1}$, where $P_k$ is the volume ratio $P_m$ at a current measurement point, and $P_{k-1}$ is the volume ratio at a preceding measurement point. Measurements at each measurement point were conducted at room temperature (23 degrees Celsius) using a radiation frequency of 1 GHz. The measurements included measurements of a real dielectric constant $\varepsilon_r$ and conductivity $\sigma$.

The connate fluids and filtrate fluids in this example are water having different concentrations of a salt (brines); however, embodiments are not limited to these examples and can be applied to any suitable water based fluids.

FIG. 3 shows a graph 60 that includes six curves representing a measured dielectric constant of six reference mixtures of connate and filtrate fluids. Each reference connate fluid and reference filtrate fluid was a brine having a selected concentration of NaCl. A curve 62 represents a fluid mixture in which the filtrate has a concentration of 10,000 parts-per-million (10 kppm) and the connate has a concentration of 100 kppm, a curve 64 represents a fluid mixture of the 10 kppm filtrate and a 150 kppm connate, and a curve 66 represents a fluid mixture of the 10 kppm filtrate and a 200 kppm connate. A curve 68 represents a fluid mixture of a 30 kppm filtrate and the 100 kppm connate, a curve 70 represents a fluid mixture of the 30 kppm filtrate and the 150 kppm connate, and a curve 72 represents a fluid mixture of the 30 kppm filtrate and the 200 kppm connate.

FIG. 3 also shows a graph 80 that includes six curves representing a measured conductivity of the six mixtures of connate and filtrate fluids. A curve 82 represents a fluid mixture of the 10 kppm filtrate and the 100 kppm connate, a curve 84 represents a fluid mixture of the 10 kppm filtrate and a 150 kppm connate, and a curve 86 represents a fluid mixture of the 10 kppm filtrate and a 200 kppm connate. A curve 88 represents a fluid mixture of a 30 kppm filtrate and the 100 kppm connate, a curve 90 represents a fluid mixture of the 30 kppm filtrate and the 150 kppm connate, and a curve 92 represents a fluid mixture of the 30 kppm filtrate and the 200 kppm connate.

Referring again to FIG. 2, at block 102, an initial dielectric measurement is performed on a volume of a downhole fluid that circulates through a borehole during a downhole operation. For example, a sample of the downhole fluid is collected (e.g., via the sampling tool 40) and retained in a container (e.g., the measurement chamber 48). The sample is a mixture of a filtrate fluid that has an initial volume ratio, which may be known or unknown. A dielectric property, such as dielectric constant and/or conductivity, is initially measured.

At block 103, an amount of the filtrate fluid used in the operation (or a similar fluid) is injected to incrementally dilute the mixture and change the volume ratio. A dielectric measurement is performed on the diluted mixture. The mixture may be incrementally diluted and measured at any number of dilutions and volume ratios.

Although the embodiments are described in conjunction with a collected fluid sample, the embodiments are not so limited. For example, a probe or other device is applied to a flow of downhole fluid in a borehole, and an initial measurement is performed at an initial measurement point. At a subsequent measurement point, the change in volume ratio is assumed based on operational parameters (e.g., rate of injection of a drilling mud, flow rate, density measurements, etc.) and/or information from other wells and/or operations.

At block 104, a measurement profile is generated based on the measurements performed at blocks 102 and 103. The measurement profile may be a collection of data points, a curve or any other representation of the measurements.

At block 105, the measurement profile is compared to each reference profile, and the reference profile is selected that is closest to the measurement profile, i.e., most closely matches the measurement profile. For example, a fitting process is performed for each reference profile, the reference profile having the best fit to the measurement profile is selected, and the reference connate fluid associated with the selected reference profile is used to estimate the dielectric property.

The dielectric property may be determined to be the same as that of the selected reference connate fluid (e.g., the salinity of the connate fluid from the sampled downhole fluid is considered to be the same as a the selected reference connate fluid), or the salinity or other property of the selected reference connate fluid is used to estimate any desired dielectric property (e.g., using the permittivity model discussed above).

Figure 4A:
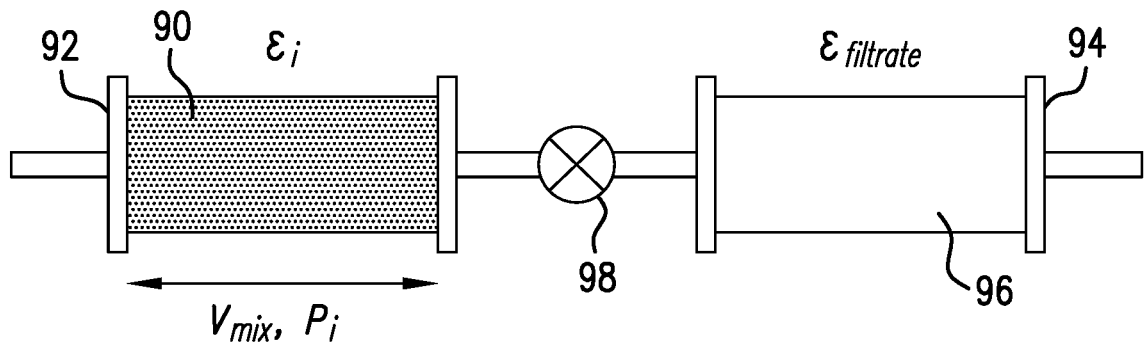
FIGS. 4A-4C depict an example of a downhole fluid sample, and aspects of generating a measurement profile.
Figure 4B:
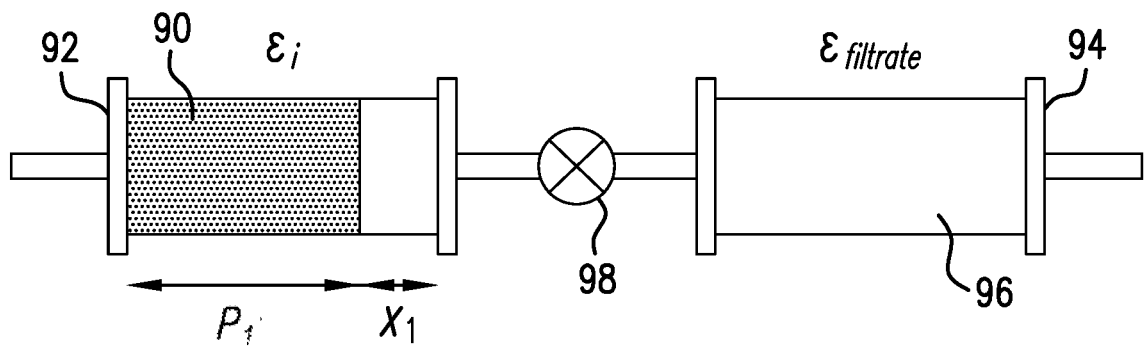
Figure 4C:
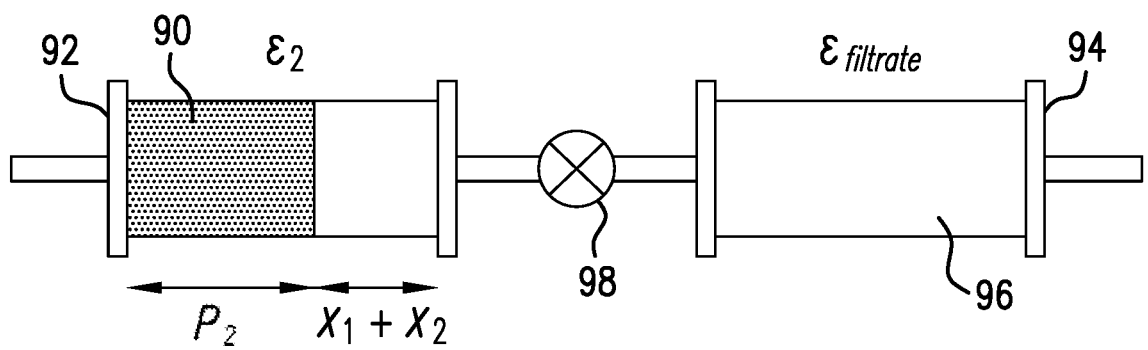

FIGS. 4A-4C depict an example of a downhole fluid sample, and aspects of generating a measurement profile. In this example, a sample of downhole fluid 90, which includes a mixture of a drilling fluid and connate water, was acquired and retained in a sample chamber 92. Total volume of the sample was $V_m$, and the sample had an initial permittivity $\varepsilon_i$ and an initial volume ratio $P_i$. FIG. 4A depicts the sample as collected.

As shown in FIG. 4A, a source 94 of filtrate fluid 96 is connected to the sample chamber 92, and injection of the filtrate fluid 96 into the sample chamber 92 is controlled by a processing device. In this example, the processing device operates a valve 98 to control the injection.

As shown in FIG. 4B, an amount of the filtrate 96 is injected into the sample chamber 92, displacing some of the downhole fluid 90. The amount or volume of the injected filtrate corresponds to an incremental change (incremental volume ratio) $x_1$, which is used to calculate a volume ratio $P_1$ in the sample chamber 92 using the equation $x_1 = P_i - P_1$.

As shown in FIG. 4C, an additional amount of the filtrate 96, which corresponds to a volume $x_2$, is injected into the sample chamber 92, displacing more of the downhole fluid 90. The volume ratio $P_2$ is calculated using the equation $x_2 = P_2 - P_1$. A dielectric property of the mixture (e.g., conductivity) is measured at the initial volume ratio and at each subsequent dilution to generate a measurement profile.

Figure 5:
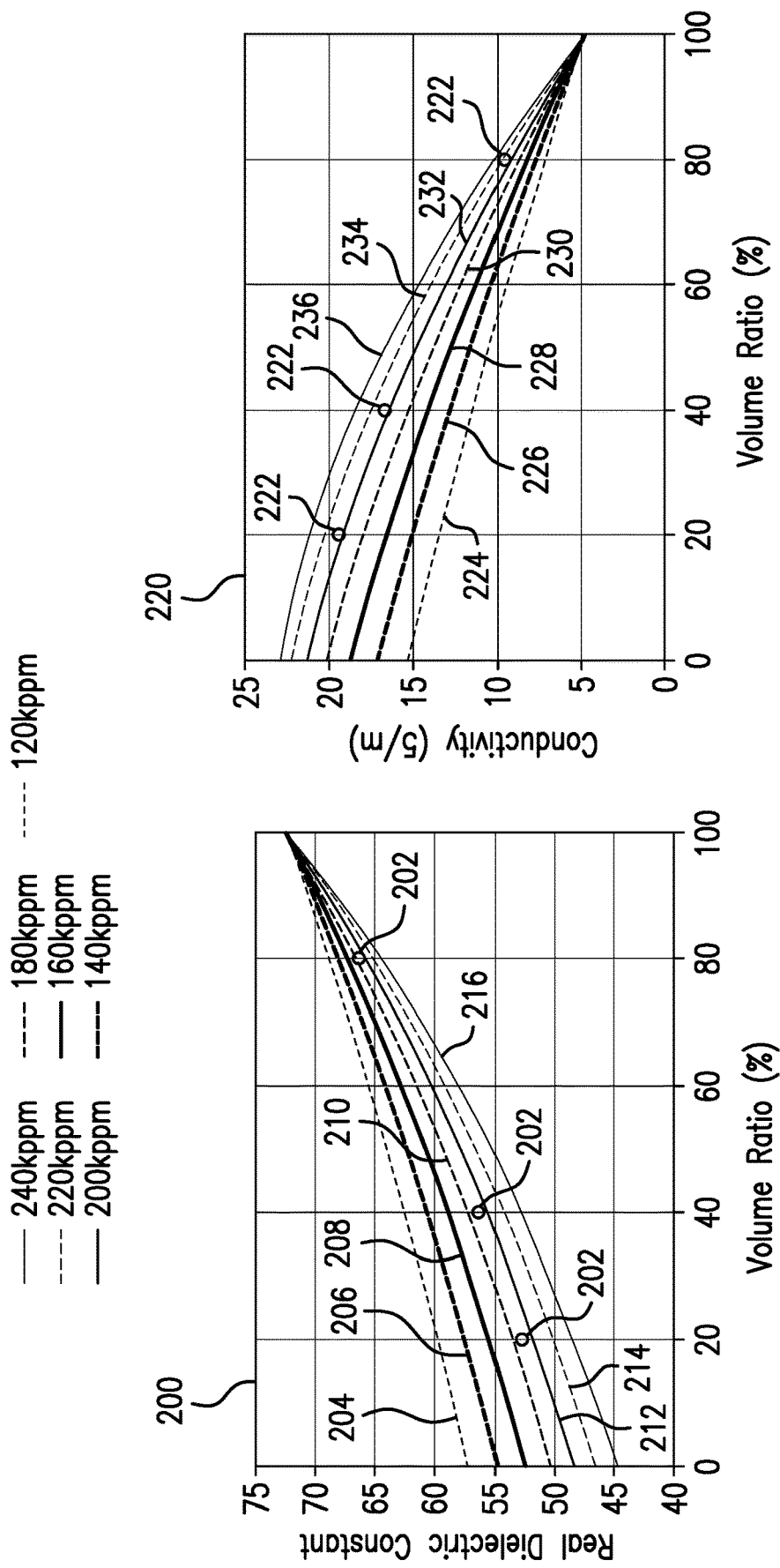
FIG. 5 depicts an example of measurement data and analysis of the measurement data according to the method of FIG. 3, for a downhole fluid having a known initial volume ratio.
Figure 6:
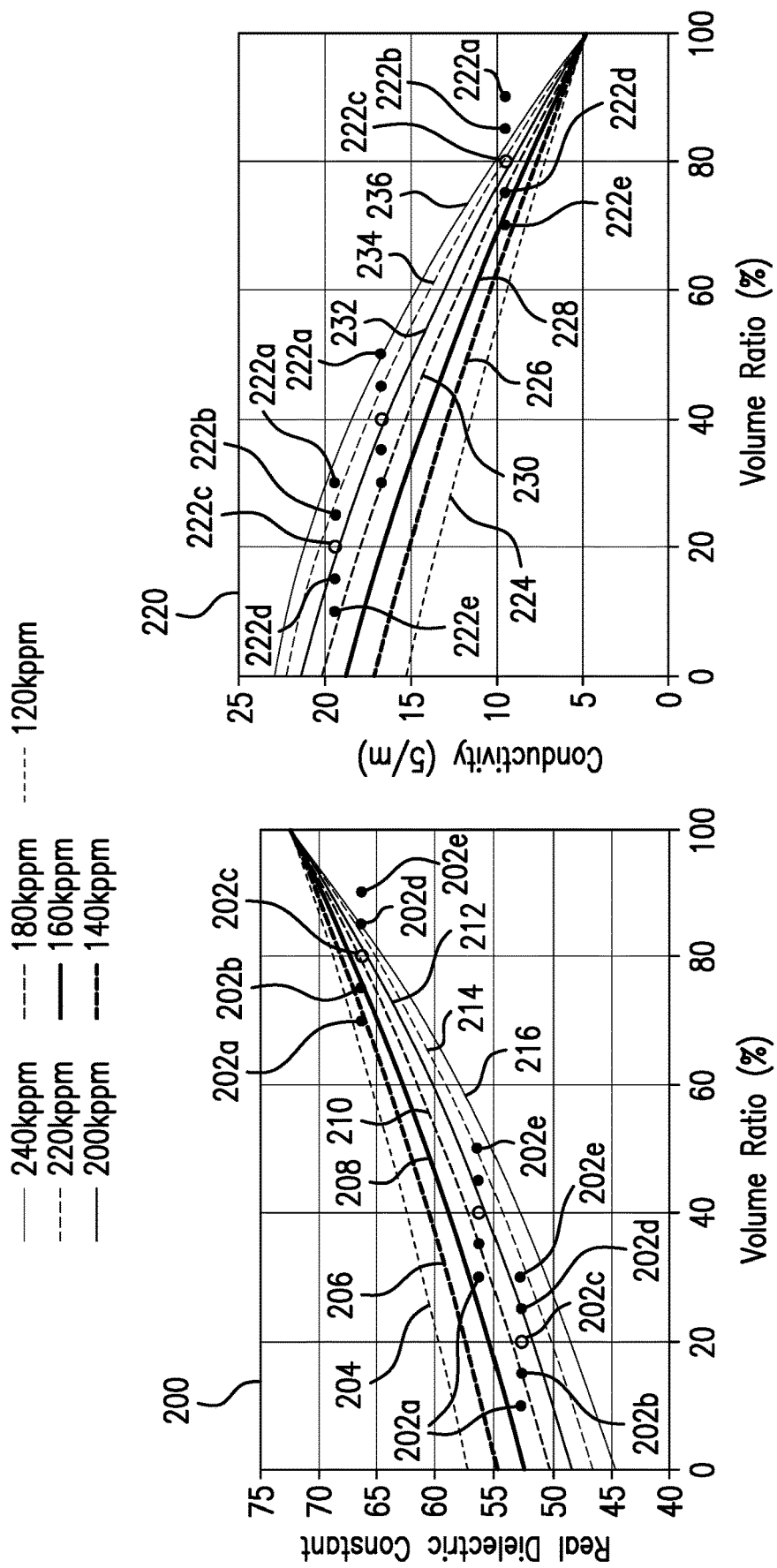
FIG. 6 depicts an example of measurement data and analysis of the measurement data according to the method of FIG. 3, for a downhole fluid having a unknown initial volume ratio

FIGS. 5 and 6 depict examples of the method 100, and illustrate aspects of a comparison between a measurement profile derived from a downhole fluid and a plurality of reference profiles. In these examples, the reference profiles were derived from dielectric measurements of six fluid mixtures, where each mixture included a 30 kppm reference filtrate fluid and a different reference connate fluid.

A measurement profile was derived from a downhole fluid sample having a volume of 50 cc, and including a mixture of a 30 kppm drilling fluid and a connate fluid. At each of five sample times k, a dielectric measurement was performed to calculate a conductivity $\sigma$ and a real dielectric constant (corresponding to real permittivity $\varepsilon_r$). For each sample time k, the downhole fluid sample was diluted with an amount of the drilling fluid to reduce the salinity according to an incremental volume ratio $x_k = P_k - P_{k-1}$.

The following table shows a data set for measurements of the downhole fluid sample:

| Sample k | $V_m$ [cc] | $V_{30ppk}$ [cc] | $x_k$ | $P_k$ | $\varepsilon_r$ @1 GHZ | $\sigma$ [S/m] |
|---|---|---|---|---|---|---|
| 1 | 50 | 0 | 0% | 0% | 48.954 | 21.422 |
| 2 | 40 | 10 | 20% | 20% | 52.816 | 19.459 |
| 3 | 30 | 20 | 20% | 40% | 56.363 | 16.754 |
| 4 | 10 | 40 | 40% | 80% | 66.412 | 9.555 |
| 5 | 0 | 50 | 20% | 100% | 72.666 | 4.902 |

FIG. 5 shows a graph 200 on which measurement data points 202 were plotted based on the above measurements. The graph 200 plots the real dielectric constant as a function of volume ratio. FIG. 5 also shows a graph 220 on which measurement data points 222 were plotted based on the above measurements. The graph 220 plots the conductivity as a function of volume ratio.

The graphs 200 and 220 also include reference profiles based on a plurality of reference fluid mixtures. Each reference fluid mixture included a brine (reference connate fluid) having a different concentration of NaCl, and a reference filtrate fluid having a concentration of 30 kppm.

The graph 200 includes a curve 204 that represents a fluid mixture in which the reference connate has a concentration of 120 kppm, a curve 206 that represents a fluid mixture in which the reference connate has a concentration of 140 kppm, a curve 208 that represents a fluid mixture in which the reference connate has a concentration of 160 kppm, and a curve 210 that represents a fluid mixture in which the reference connate has a concentration of 180 kppm. A curve 212 represents a fluid mixture in which the reference connate has a concentration of 200 kppm, a curve 214 represents a fluid mixture in which the reference connate has a concentration of 220 kppm, and a curve 216 represents a fluid mixture in which the reference connate has a concentration of 240 kppm.

The graph 220 includes a curve 224 that represents a fluid mixture in which the reference connate has a concentration of 120 kppm, a curve 226 that represents a fluid mixture in which the reference connate has a concentration of 140 kppm, a curve 228 that represents a fluid mixture in which the reference connate has a concentration of 160 kppm, and a curve 230 that represents a fluid mixture in which the reference connate has a concentration of 180 kppm. A curve 232 represents a fluid mixture in which the reference connate has a concentration of 200 kppm, a curve 234 represents a fluid mixture in which the reference connate has a concentration of 220 kppm, and a curve 236 represents a fluid mixture in which the reference connate has a concentration of 240 kppm.

As can be seen in the example of FIG. 5, the measurement points 202 most closely match or fit the curve 212, and the measurement points 222 most closely match the reference curve 222. Accordingly, the salinity of the unknown connate fluid was estimated to be about 200 kppm.

The method 100 can be performed if the initial volume ratio of a downhole fluid sample is known or unknown. If the initial volume ratio is known, the incremental dilutions can be used to determine the actual volume ratios.

In an embodiment, the method 100 can be performed using the incremental dilutions with an unknown initial volume ratio of a downhole fluid sample. In this embodiment, the comparison includes moving a measurement profile simultaneously along the volume ratio axis in order to seek a match between the data points in the measurement profile.

FIG. 6 depicts the reference curves and the measurement profile of the example of FIG. 5. However in this example, the initial volume ratio $P_i$ is not known. The measurement points 202 and the measurement points 222 were shifted, and at each shifted position, the measurement points were compared to each reference profile to determine whether the measurement points matched any of the reference profiles.

The measurement profile of graph 200 was shifted from an initial position (measurement points 202a), to various positions shown by measurement points 202b, 202c, 202d and 202e. In this example, the measurement points 202c were found to have the closest match to a reference curve, i.e., the reference curve 212. Likewise, the measurement profile of graph 220 was shifted from an initial position (measurement points 222a), to positions shown by measurement points 222b, 222c, 222d and 222e, and the measurement points 222c were found to have the closest match to a reference curve, i.e., the reference curve 232. Accordingly, the salinity of the unknown connate fluid was estimated to be about 200 kppm.

Set forth below are some embodiments of the foregoing disclosure:

Embodiment 1: A method of analyzing a downhole fluid, comprising: performing measurements of a dielectric property of the downhole fluid, the downhole fluid including a mixture of a filtrate fluid circulated through a borehole and a connate fluid originating in a subterranean region proximate to the borehole, the filtrate fluid having a known value of a dielectric property, the downhole fluid having an initial value of a volume ratio corresponding to a ratio of a volume of the filtrate fluid to the volume of the downhole fluid, wherein the measurements include a first measurement of the downhole fluid, and one or more additional measurements, each additional measurement performed after an amount of the filtrate fluid is injected into the downhole fluid to change the volume ratio, each additional measurement performed when the downhole fluid has a different volume ratio; acquiring a plurality of reference profiles, each reference profile acquired by at least one of measuring the dielectric property of a respective reference mixture and estimating the dielectric property by a mathematical model, the respective reference mixture including a first fluid and a reference fluid, the first fluid having the known value of the dielectric property, each reference profile representing a change in the dielectric property of the respective reference mixture as a function of a change in a volume ratio of the respective reference mixture; and comparing the measurements to each reference profile, and estimating a value of the dielectric property of the connate fluid based on the comparing.

Embodiment 2: The method as in any prior embodiment, wherein the comparing includes comparing the measurements to each reference profile, and selecting a reference profile that is closest to the measurements.

Embodiment 3: The method as in any prior embodiment, wherein the comparing includes calculating a measurement profile from the measurements based on incremental volume ratio changes between each of the first measurement and the one or more additional measurements, and shifting the measurement profile along a volume ratio axis until the measurement profile matches one of the reference profiles.

Embodiment 4: The method as in any prior embodiment, wherein the dielectric property includes at least one of: a dielectric constant, a permittivity, a conductivity and a resistivity.

Embodiment 5: The method as in any prior embodiment, wherein the filtrate fluid is a water-based fluid injected into the borehole, the water-based fluid has a known salinity, and the connate fluid includes water extracted from the subterranean region.

Embodiment 6: The method as in any prior embodiment, wherein the first fluid has a salinity that is at least substantially the same as the known salinity, and the reference fluid has a salinity that is different than the selected salinity.

Embodiment 7: The method as in any prior embodiment, wherein estimating the value of the dielectric property includes estimating a salinity of the connate fluid based on the comparing, and estimating the dielectric property based on the estimated salinity of the connate fluid.

Embodiment 8: The method as in any prior embodiment, wherein the dielectric property is estimated based on the estimated salinity and a permittivity model of the downhole fluid.

Embodiment 9: The method as in any prior embodiment, wherein performing the measurements includes extracting the downhole fluid into a container having a fixed volume, wherein the filtrate fluid is injected into the container and displaces a portion of the downhole fluid.

Embodiment 10: The method as in any prior embodiment, wherein the filtrate fluid is injected into the downhole fluid from at least one of a surface location and a downhole location, and the amount of the fluid injected at each additional measurement is estimated based on at least one of: operational parameters of the subterranean operation and information from other subterranean operations.

Embodiment 11: A system for analyzing a downhole fluid, comprising: a measurement device configured to measure a dielectric property of the downhole fluid, the downhole fluid including a mixture of a filtrate fluid circulated through a borehole and a connate fluid originating in a subterranean region proximate to the borehole, the filtrate fluid having a known value of the dielectric property, the downhole fluid having an initial value of a volume ratio corresponding to a ratio of a volume of the filtrate fluid to the volume of the downhole fluid; and a processing device configured to perform: receiving measurements of the dielectric property of the downhole fluid, the measurements including a first measurement of the downhole fluid, and one or more additional measurements, each additional measurement performed after an amount of the filtrate fluid is injected into the downhole fluid to change the volume ratio, each additional measurement performed when the downhole fluid has a different volume ratio; acquiring a plurality of reference profiles, each reference profile acquired by at least one of measuring the dielectric property of a respective reference mixture and estimating the dielectric property by a mathematical model, the respective reference mixture including a first fluid and a reference fluid, the first fluid having the known value of the dielectric property, each reference profile representing a change in the dielectric property of the respective reference mixture as a function of a change in a volume ratio of the respective reference mixture; and comparing the measurements to each reference profile, and estimating a value of the dielectric property of the connate fluid based on the comparing.

Embodiment 12: The system as in any prior embodiment, wherein the comparing includes comparing the measurements to each reference profile, and selecting a reference profile that is closest to the measurements.

Embodiment 13: The system as in any prior embodiment, wherein the comparing includes calculating a measurement profile from the measurements based on incremental volume ratio changes between each of the first measurement and the one or more additional measurements, and shifting the measurement profile along a volume ratio axis until the measurement profile matches one of the reference profiles.

Embodiment 14: The system as in any prior embodiment, wherein the filtrate fluid is a water-based fluid injected into the borehole, the water-based fluid has a known salinity, and the connate fluid includes water extracted from the subterranean region.

Embodiment 15: The system as in any prior embodiment, wherein the first fluid has a salinity that is at least substantially the same as the known salinity, and the reference fluid has a salinity that is different than the selected salinity.

Embodiment 16: The system as in any prior embodiment, wherein estimating the value of the dielectric property includes estimating a salinity of the connate fluid based on the comparing, and estimating the dielectric property based on the estimated salinity of the connate fluid.

Embodiment 17: The system as in any prior embodiment, wherein the dielectric property is estimated based on the estimated salinity and a permittivity model of the downhole fluid.

Embodiment 18: The system as in any prior embodiment, wherein performing the measurements includes extracting the downhole fluid into a container having a fixed volume, wherein the extracting includes one of: injecting the filtrate fluid into the container and displacing a portion of the downhole fluid; or injecting the downhole fluid into the container filled with the filtrate fluid and displacing a portion of the filtrate fluid.

Embodiment 19: The system as in any prior embodiment, wherein the filtrate fluid is injected into the downhole fluid from at least one of a surface location and a downhole location, and the amount of the fluid injected at each additional measurement is estimated based on at least one of: operational parameters of the subterranean operation and information from other subterranean operations.

Embodiment 20: The system as in any prior embodiment, wherein the measurement device includes a measurement probe configured to be immersed in the downhole fluid.

As used herein generation of data in "real time" is taken to mean generation of data at a rate that is useful or adequate for making decisions during or concurrent with processes such as production, experimentation, verification, and other types of surveys or uses as may be opted for by a user. It should be recognized that "near real time" is to be taken in context, and does not necessarily indicate the instantaneous determination of data, or make any other suggestions about the temporal frequency of data collection and determination.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed:

1. A method of analyzing a downhole fluid, comprising:
performing measurements of a dielectric property of the downhole fluid, the downhole fluid including a mixture of a filtrate fluid circulated through a borehole and a connate fluid originating in a subterranean region proximate to the borehole, the filtrate fluid having a known value of a dielectric property, the downhole fluid having an initial value of a volume ratio corresponding to a ratio of a volume of the filtrate fluid to the volume of the downhole fluid,
wherein the measurements include a first measurement of the downhole fluid, and one or more additional measurements, each additional measurement performed after an amount of the filtrate fluid is injected into the downhole fluid to change the volume ratio, each additional measurement performed when the downhole fluid has a different volume ratio;
acquiring a plurality of reference profiles, each reference profile acquired by at least one of measuring the dielectric property of a respective reference mixture and estimating the dielectric property by a mathematical model, the respective reference mixture including a first fluid and a reference fluid, the first fluid having the known value of the dielectric property, each reference profile representing a change in the dielectric property of the respective reference mixture as a function of a change in a volume ratio of the respective reference mixture; and
comparing the measurements to each reference profile, wherein the comparing includes calculating a measurement profile from the measurements based on incremental volume ratio changes between each of the first measurement and the one or more additional measurements, and estimating a value of the dielectric property of the connate fluid based on the comparing.

2. The method of claim 1, wherein the comparing includes comparing the measurements to each reference profile, and selecting a reference profile that is closest to the measurements.

3. The method of claim 1, wherein the comparing includes shifting the measurement profile along a volume ratio axis until the measurement profile matches one of the reference profiles.

4. The method of claim 1, wherein the dielectric property includes at least one of: a dielectric constant, a permittivity, a conductivity and a resistivity.

5. The method of claim 1, wherein the filtrate fluid is a water-based fluid injected into the borehole, the water-based fluid has a known salinity, and the connate fluid includes water extracted from the subterranean region.

6. The method of claim 5, wherein the first fluid has a salinity that is at least substantially the same as the known salinity, and the reference fluid has a salinity that is different than the selected salinity.

7. The method of claim 6, wherein estimating the value of the dielectric property includes estimating a salinity of the connate fluid based on the comparing, and estimating the dielectric property based on the estimated salinity of the connate fluid.

8. The method of claim 7, wherein the dielectric property is estimated based on the estimated salinity and a permittivity model of the downhole fluid.

9. The method of claim 1, wherein performing the measurements includes extracting the downhole fluid into a container having a fixed volume, wherein the filtrate fluid is injected into the container and displaces a portion of the downhole fluid.

10. The method of claim 1, wherein the filtrate fluid is injected into the downhole fluid from at least one of a surface location and a downhole location, and the amount of the fluid injected at each additional measurement is estimated based on at least one of: operational parameters of the subterranean operation and information from other subterranean operations.

11. The system of claim 10, wherein the measurement device includes a measurement probe configured to be immersed in the downhole fluid.

12. A system for analyzing a downhole fluid, comprising:
a measurement device configured to measure a dielectric property of the downhole fluid, the downhole fluid including a mixture of a filtrate fluid circulated through a borehole and a connate fluid originating in a subterranean region proximate to the borehole, the filtrate fluid having a known value of the dielectric property, the downhole fluid having an initial value of a volume ratio corresponding to a ratio of a volume of the filtrate fluid to the volume of the downhole fluid; and
a processing device configured to perform:
receiving measurements of the dielectric property of the downhole fluid, the measurements including a first measurement of the downhole fluid, and one or more additional measurements, each additional measurement performed after an amount of the filtrate fluid is injected into the downhole fluid to change the volume ratio, each additional measurement performed when the downhole fluid has a different volume ratio;
acquiring a plurality of reference profiles, each reference profile acquired by at least one of measuring the dielectric property of a respective reference mixture and estimating the dielectric property by a mathematical model, the respective reference mixture including a first fluid and a reference fluid, the first fluid having the known value of the dielectric property, each reference profile representing a change in the dielectric property of the respective reference mixture as a function of a change in a volume ratio of the respective reference mixture; and
comparing the measurements to each reference profile, wherein the comparing includes calculating a measurement profile from the measurements based on incremental volume ratio changes between each of the first measurement and the one or more additional measurements, and estimating a value of the dielectric property of the connate fluid based on the comparing.

13. The system of claim 12, wherein the comparing includes comparing the measurements to each reference profile, and selecting a reference profile that is closest to the measurements.

14. The system of claim 12, wherein the comparing includes shifting the measurement profile along a volume ratio axis until the measurement profile matches one of the reference profiles.

15. The system of claim 12, wherein the filtrate fluid is a water-based fluid injected into the borehole, the water-based fluid has a known salinity, and the connate fluid includes water extracted from the subterranean region.

16. The system of claim 15, wherein the first fluid has a salinity that is at least substantially the same as the known salinity, and the reference fluid has a salinity that is different than the selected salinity.

17. The system of claim 16, wherein estimating the value of the dielectric property includes estimating a salinity of the connate fluid based on the comparing, and estimating the dielectric property based on the estimated salinity of the connate fluid.

18. The system of claim 17, wherein the dielectric property is estimated based on the estimated salinity and a permittivity model of the downhole fluid.

19. The system of claim 12, wherein performing the measurements includes extracting the downhole fluid into a container having a fixed volume, wherein the extracting includes one of: injecting the filtrate fluid into the container and displacing a portion of the downhole fluid; or injecting the downhole fluid into the container filled with the filtrate fluid and displacing a portion of the filtrate fluid.

20. The system of claim 12, wherein the filtrate fluid is injected into the downhole fluid from at least one of a surface location and a downhole location, and the amount of the fluid injected at each additional measurement is estimated based on at least one of: operational parameters of the subterranean operation and information from other subterranean operations.

* * * * *